June 20, 1967 A. DUBOIS ETAL 3,326,143
DOUGH KNEADING MACHINE
Filed March 18, 1965 3 Sheets-Sheet 1

INVENTORS
Albert DUBOIS
Armand DUBOIS

ATTORNEYS

INVENTORS
Albert DUBOIS
Armand DUBOIS

ATTORNEYS

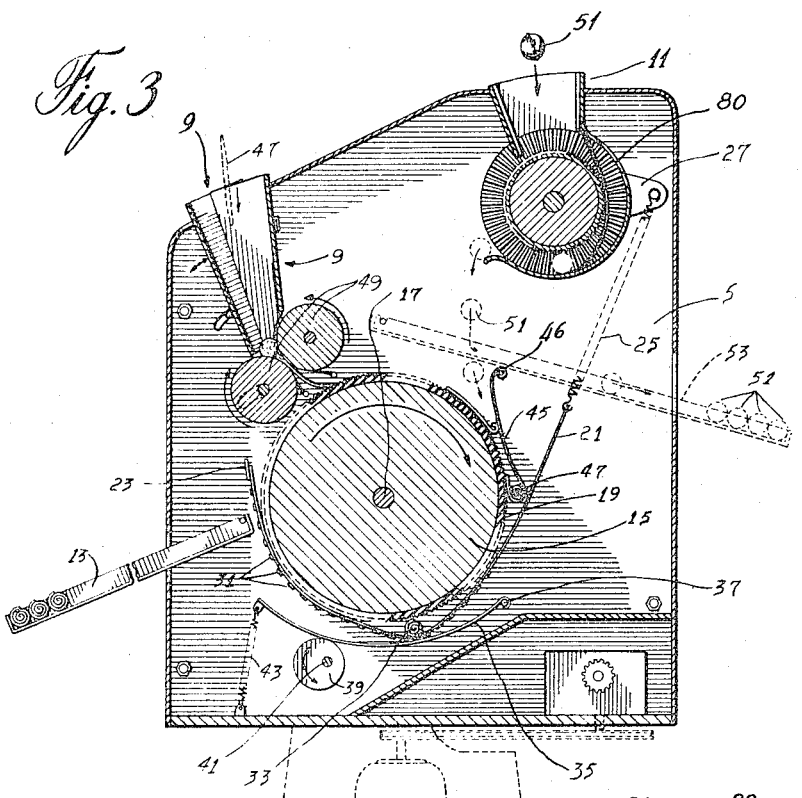
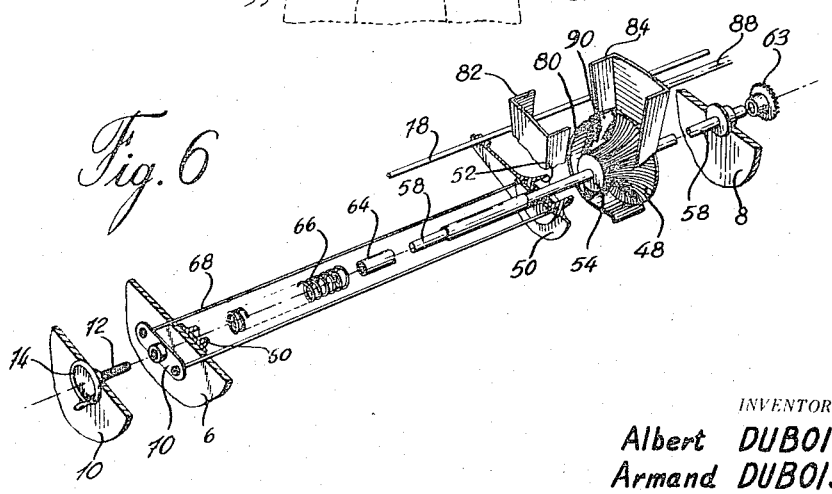

United States Patent Office 3,326,143
Patented June 20, 1967

---

3,326,143
DOUGH KNEADING MACHINE
Albert Du Bois, 6105 de Vimy, and Armand Du Bois,
8431 Clarke, both of Montreal, Quebec, Canada
Filed Mar. 18, 1965, Ser. No. 440,957
9 Claims. (Cl. 107—9)

The present invention relates to a dough kneading machine for making various kinds of pastries.

There are several different types of dough kneading machines presently on the market for the mass production of various kinds of pastries. However, none of the existing machines are suitable or lend themselves for the kneading of puff paste or butter dough. When it comes to making pastries with puff paste, the only way of making them is by hand because of its sticking property. It will of course be realised that such a method is not very rapid and consequently costly. Also, the resulting pastries are liable to vary greatly in size and shape, unless prepared by a competent baker.

It is consequently a main object of the invention to provide a machine which can handle butter dough in the making of this particular type of pastry.

Also an object of the invention resides in the provision of such a machine which is quite similar as to cost to those of the conventional type.

It is yet another object of the invention to provide a dough kneading machine for the production of puff pastries of more uniform shape than can be obtained by hand or with conventional machines. The machine of the invention is of particular use for the automatic making of puff pastries of the type consisting of a rolled sheet which is then bent in the form of a crescent and cooked.

Still another object of the invention is the provision of a preshaping device for giving a spherical form before feeding it in the kneading device of the machine, this preshaping device being further adjustable for the production of finger rolls.

The above mentioned objects may be obtained with a dough kneading machine comprising: a rotatable cylinder having a peripheral kneading surface; a stationary flexible belt mounted around part of said surface; resilient means pressing said belt against said kneading surface, and a plurality of elongated spaced parallel stiffening means including members extending transversely of said belt, longitudinally of said cylinder; said means defining a succession of alternate stiff and soft strips on said belt to simulate the kneading action of fingers on dough.

It is believed that a better understanding of the invention will be afforded by the description that follows having reference to the appended drawing wherein:

FIG. 3 is a vertical cross-sectional view through the machine of the invention;

FIG. 6 is an exploded view of a dough preshaping device according to the invention.

Figure 1:
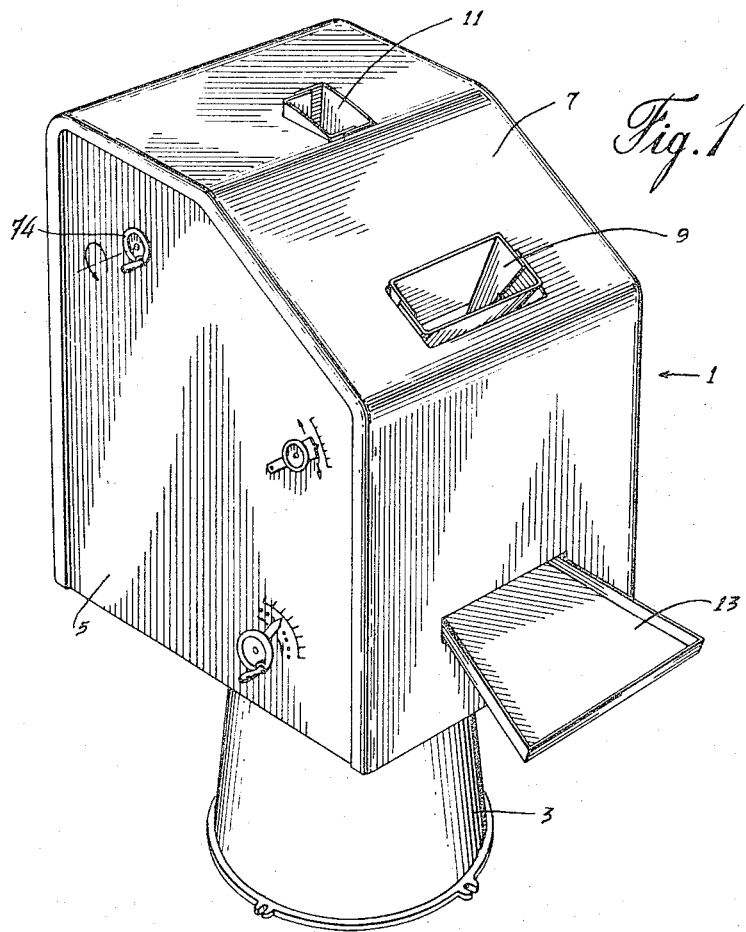
FIG. 1 is a perspective view of the machine of the invention.

With reference to the figures of the drawings, the kneading machine 1 is mounted on a base 3 and is formed of a body 5 closed by a cover 7. Projecting through cover 7 are two hoppers 9 and 11, for two different kinds of pastries, and the dough shapes collecting spout 13.

Figure 4:
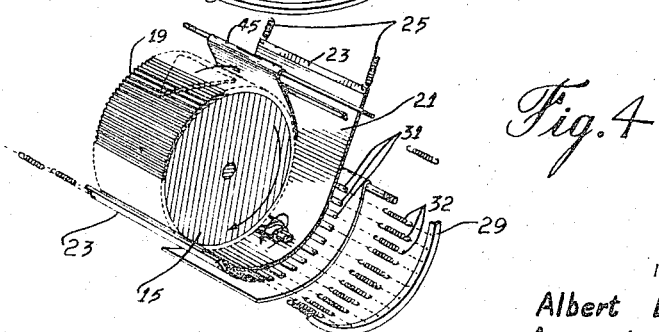
FIG. 4 is an exploded view of the actual kneading mechanism of the invention.

Basically, the invention comprises a cylinder 15 secured on a central axle 17 mounted for rotation on two opposed side walls of body 5. The peripheral outer surface of cylinder 15 is formed as a kneading surface, preferably by means of vinyl, nylon or the like plastic covering 19 having a plurality of spaced parallel transverse ridges extending longitudinally of the cylinder as clearly shown in both FIGURES 3 and 4. This covering 19 is consequently somewhat corrugated and is retained on cylinder 15 in any known manner such as being glued thereon.

The kneading mechanism also comprises a flexible belt 21, preferably canvas, which is elongated and generally rectangular in shape. Both ends of belt 21 are fixed to transverse metal plates 23. Belt 21 is mounted around the lower part of the cylinder and of a width to fully cover that lower part. One metal plate 23 is secured to the side walls of body 5 while the other plate 23 is connected by means of two springs 25 to a bracket 27 pivotally mounted on side walls 6, 8 to be moveable upwardly or downwardly whereby to adjust the tension in springs 25. Consequently, the stationary flexible belt 21 is provided with resilient means at one end thereof to press it against the kneading surface defined by the covering 19.

Two arcuate stationary rigid bands 29 are fixed to the side walls of body 5, the said bands having generally the same curvature as that of covering 19 and disposed along the side edges thereof. A plurality of parallel spaced elongated leaves 31 are disposed transversely of belt 21, outwardly thereof in relation to the kneading surface of covering 19. For each of the leaves 31, there are two springs 32, one at each end, joining leaves 31 to the adjacent rigid bands 29.

As another feature, the invention provides an arcuate member 35 (FIG. 3), preferably resilient, having a radius of curvature greater than the radius of cylinder 15 and located below flexible belt 21. Means such as a pin 37 mounts one end of member 35 along an axis parallel to the axis of cylinder 15 and a cam 39 eccentrically mounted on an axle 41 also parallel to axle 17 is provided to cause upward movement of arcuate member 35. A return spring 43 secured to the bottom of body 5 ensures constant contact of member 35 with the surface of cam 39. Rotation of cam 39 may be obtained by any known means such as by a handle wheel, on axle 41, located outside body 5.

One end of belt 21 projects tangentially of cylinder 15 as clearly shown in FIG. 3 to define a dough input therebetween and a short canvas curtain 45 having a rough surface to induce a sheet of dough to start curling up, as illustrated, hangs in said input from a supporting rod 46.

Figure 5:
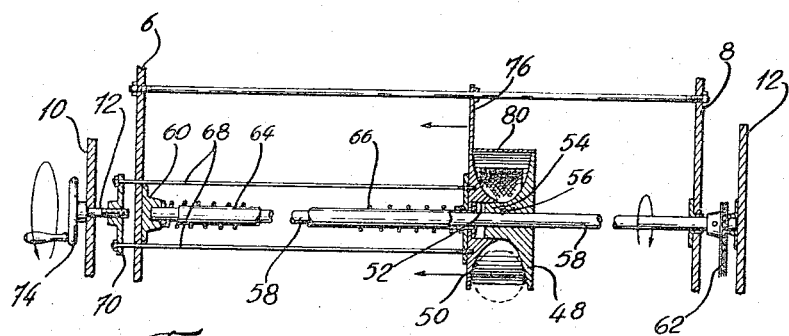
FIG. 5 is a cross-sectional view along line 5—5 of FIG. 2.

Also part of the invention, is a dough preshaping device, shown in detail in FIGS. 5 and 6.

The device is a mold formed of two cooperating parts 48 and 50, defining therebetween a hollow space having the form of an annulus, open at the outer periphery thereof and rounded at the inner periphery, as clearly seen in FIG. 5. Part 50 has a central bore 52 for the sliding reception of the hub 54 of part 48.

Means are provided for the relative rotation and relative displacement of parts 48, 50, about and along the axis of the annulus, in the following preferred manner.

Part 48 is secured, as by set screw 56 to a shaft 58 extending between the inner side walls 6 and 8 of body 5, one end rotatably mounted in a bearing 60 and the other end projecting through side wall 8. The shaft 58 is brought into rotation by any suitable drive 62 located between inner and outer side walls 8 and 12.

Part 50 is fixed at the end of a sleeve 64 slidably mounted over shaft 58 and a spring 66 abutting part 50 and bearing 60 tends to drive part 50 toward part 48.

A pair of adjusting rods 68 have one end screwed into part 50 while the other ends slidably extend through inner side wall 6 to be secured to a collar 70, the center of which has a threaded hole for the reception of a non-axially movable but rotatable operating screw 72 brought into rotation by a handle 74.

To prevent twisting of part 50, under the rotating action of part 48, a projection 76 of the said part 50 is mounted for sliding movement along a transverse bar 78 secured on inner side walls 6 and 8.

Figure 2:
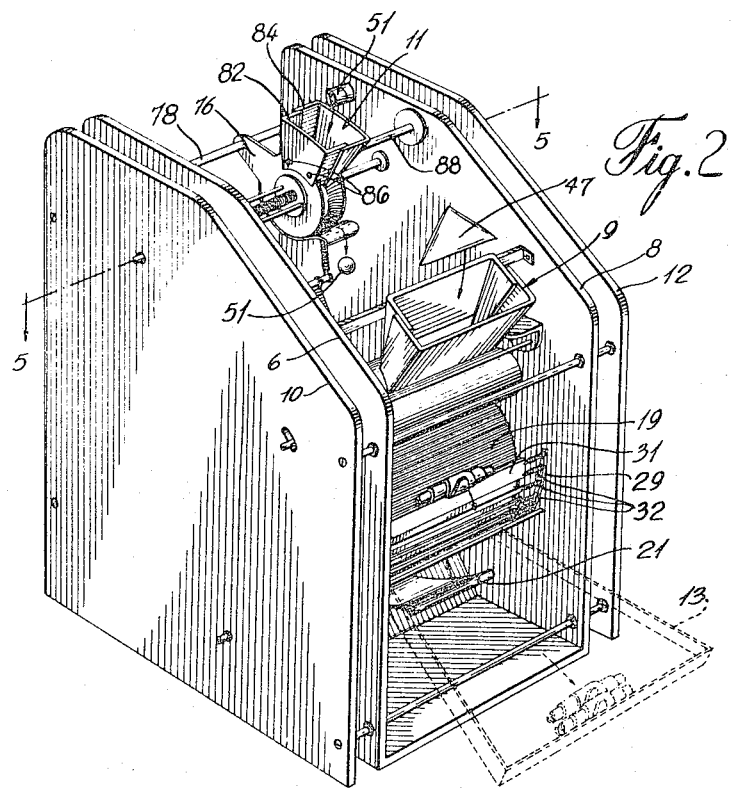
FIG. 2 is a perspective view of the machine of the invention with the top cover removed.

Hopper 11 is also formed of two complementary members 82 and 84, channel-shaped in cross-section and one slightly narrower than the other so as to enter into it in the manner shown in FIG. 2 particularly.

Hopper member 82 is fixed to mold part 50 as by means of screws 86 (FIG. 2) while hopper member 84 is held in position by a rod 88 projecting inwardly from side wall 8.

A confining and guiding arcuate rigid strap 80 hangs from a flange of hopper member 84 to close a portion of the open periphery of the annular space formed by the mold parts 48, 50 and extends therearound past the lower center thereof in the direction of rotation of part 48.

Preferably a strap 90, made of canvas having a rough surface, is attached to the same flange to project in the annular space between strap 80 and the inner surface of the mold.

Preferably also, the active inner surface of the mold has radial serrations in the manner of those on covering 19 of roller 15.

It will now be understood that dough lumps, such as 51, are fed into hopper 11 and directed against the inner surface of the mold and biased thereagainst by the flexible strap 90. The rotating part 48 in cooperation with the fixed part 50 kneads the dough into a sphere 51 during its travel toward the end of strap 78.

Dough hopper means 9 is of conventional form and particularly adapted for the pre-shaping of dough intended to be rolled upon itself in the maner illustrated in FIG. 2 for the making of the French pastries called "croissants." This is obtained with a triangular dough sheet 47 also shown in FIG. 2.

After having travelled between the two pressure rollers 49, the separating distance of which may be varied to suit the desired thickness, triangular sheet 47 falls on Teflon covering 19 and as soon as it reaches canvas curtain 45, the light pressure thereof curls the front edge with the help of the corrugations on covering 19. After leaving curtain 45, the rolled sheet 47 falls between belt 21 and covering 19. It is pressed thereon by the light springs 25 and particularly by the transverse members or leaves 31. It should be understood at this point that the stiffening means consisting of leaves 31 with their cooperating springs 32 define a succession of alternate stiff and soft strips on the flexible belt 21 to thus simulate the kneading action of fingers on dough. Adjustment of the pressure on the dough may be obtained both by movement of brackets 27 to loosen or tighten belt 21, and cam 39 to pivot arcuate member 35 as will readily be understood from a study of FIG. 3.

Once the shaped dough has reached the other end of the belt 21, on the frontward side thereof (see FIG. 3) it falls on the previously mentioned collecting spout 13.

In the case of simple rolls, such as rolls 51 of FIG. 3, these are intended to form elongated cylindrical bread finger rolls. However, should spherical rolls be required, a further spout 53 may be located between the pre-shaping means 11 and the input to the kneading mechanism as illustrated in dotted lines in FIG. 3. In this instance, the spherically shaped dough is intercepted before it reaches the space between curtain 45 and covering 19.

Although a preferred embodiment has been described, it will be understood that various modifications may be made thereto without departing from the spirit of the invention, the scope of which is set forth in the appended claims.

We claim:
1. A dough kneading machine comprising:
   (a) a rotatable cylinder having a peripheral kneading surface formed with indentations;
   (b) a stationary flexible belt mounted around part of said surface;
   (c) resilient means pressing said belt against said kneading surface, and
   (d) a plurality of elongated spaced parallel stiffening means including members extending transversely of said belt, longitudinally of said cylinder; said stiffening means defining a succession of alternate stiff and soft strips on said belt to simulate the kneading action of fingers on dough.

2. A machine as claimed in claim 1 wherein said stiffening means comprises arcuate rigid bands generally following the side edges of said belt and springs joining the ends of said members to said bands.

3. A machine as claimed in claim 1 wherein said indentations are spaced parallel ridges formed transversely of said kneading surface, longitudinally thereof.

4. A dough kneading machine comprising:
   (a) a rotatable cylinder having a peripheral kneading surface formed with a plurality of spaced parallel transverse ridges extending longitudinally of the cylinder;
   (b) a stationary flexible belt mounted around the lower part of said cylinder;
   (c) resilient means at the ends of said belt to press it against said kneading surface;
   (d) rigid arcuate stationary bands adjacent the side edges of said flexible belt;
   (e) a plurality of parallel spaced elongated leaves disposed transversely of said belt, outwardly thereof in relation to said kneading surface, and
   (f) spring joining the ends of said leaves to said bands to press the leaves against said belt whereby said leaves act as kneading fingers when a lump of dough is fed between the belt and band and travels therebetween as said cylinder rotates.

5. A machine as claimed in claim 4 including a frame on which said cylinder is mounted for rotation and said bands are fixed; an arcuate member of a radius of curvature greater than the radius of said cylinder and located beneath said flexible belt pivotally mounting one end of said member along an axis parallel to the axis of said cylinder and cam means to pivot said member and move it in relation to said flexible belt whereby to increase pressure on the said lump of dough as it moves between the cylinder and belt.

6. A machine as claimed in claim 4 wherein one end of said belt projects tangentially of said cylinder to define a dough input therebetween, and a leaf spring finger mounted to press on said cylinder in said dough input and in the direction of rotation of said cylinder.

7. Molding die means for puff paste comprising:
   (a) two cooperating molding parts defining therebetween a hollow space having the form of an annulus open at the outer periphery and rounded at the inner periphery thereof; the parts being interconnected for relative movement at generally the center of said rounded inner periphery;
(b) means mounting said parts for rotation of one of said parts about the axis of said annulus;
(c) means mounting said parts for relative displacement along the axis of said annulus;
(d) a hopper above said molding parts for directing dough lumps into said annular space, and
(e) a guiding and confining arcuate rigid strap closing a portion of the open periphery thereof from the top and past the lower center of the mold parts in the direction of rotation of said rotatable part.

8. Die means according to claim 7, including a strap of rough flexible canvas material disposed between said rigid strap and the rounded surface of said annulus to bias dough lumps against said rounded surface.

9. Die means according to claim 8 wherein the mold parts have radial serrations at said inner periphery.

References Cited
UNITED STATES PATENTS

| | | | |
|---|---|---|---|
| 860,269 | 7/1907 | Temple | 107—9 |
| 1,581,141 | 4/1926 | Royan | 107—9 |

FOREIGN PATENTS

| | | |
|---|---|---|
| 1,320,065 | 1/1963 | France. |

WALTER A. SCHEEL, *Primary Examiner.*

J. SHEA, *Assistant Examiner.*